United States Patent [19]

Hashimoto et al.

[11] 4,303,195

[45] Dec. 1, 1981

[54] THERMALLY RESPONSIVE VALVE DEVICE

[75] Inventors: Nobuyuki Hashimoto; Atsushi Satomoto, both of Toyota, Japan

[73] Assignee: Aisin Seiki Kabushiki Kaisha, Kariya, Japan

[21] Appl. No.: 190,767

[22] Filed: Sep. 25, 1980

[51] Int. Cl.³ ............................................ G05D 23/10
[52] U.S. Cl. ................... 236/48 R; 123/568; 137/637.2; 236/87; 236/101 C
[58] Field of Search .................. 236/48 R, 87, 101 C, 236/101 B; 137/637.2; 123/568, 421, 407

[56] References Cited

U.S. PATENT DOCUMENTS

| | | | |
|---|---|---|---|
| 4,076,172 | 2/1978 | Inada et al. | 236/87X |
| 4,117,976 | 10/1978 | Doherty, Jr. | 236/48 R |
| 4,128,203 | 12/1978 | Maltby | 123/421 X |
| 4,157,158 | 6/1979 | Kitamura et al. | 236/87 X |
| 4,182,485 | 1/1980 | Kitamura | 137/637.2 X |

*Primary Examiner*—William E. Tapolcai, Jr.

*Attorney, Agent, or Firm*—Sughrue, Mion, Zinn, Macpeak and Seas

[57] ABSTRACT

A thermally responsive valve includes first and second bimetallic disks which are adapted to snap-over in response to first and second predetermined temperatures. First and second inlet ports are connected to vacuum and atmospheric pressure sources respectively and first and second outlet ports are connectable to first and second vacuum actuators respectively. The thermally responsive valve further includes first and second valve members, one of which controls the communication of vacuum to the first vacuum actuator in response to the snap-over action of the first bimetallic disk and the other of which controls the application of vacuum to said second vacuum actuator in response to the snap-over action of the second bimetallic disk. When communication between the vacuum source and the first and second vacuum actuators is interrupted by said first and second valve members, the first and second actuators will be then connected to the atmosphere through the second inlet port.

4 Claims, 1 Drawing Figure

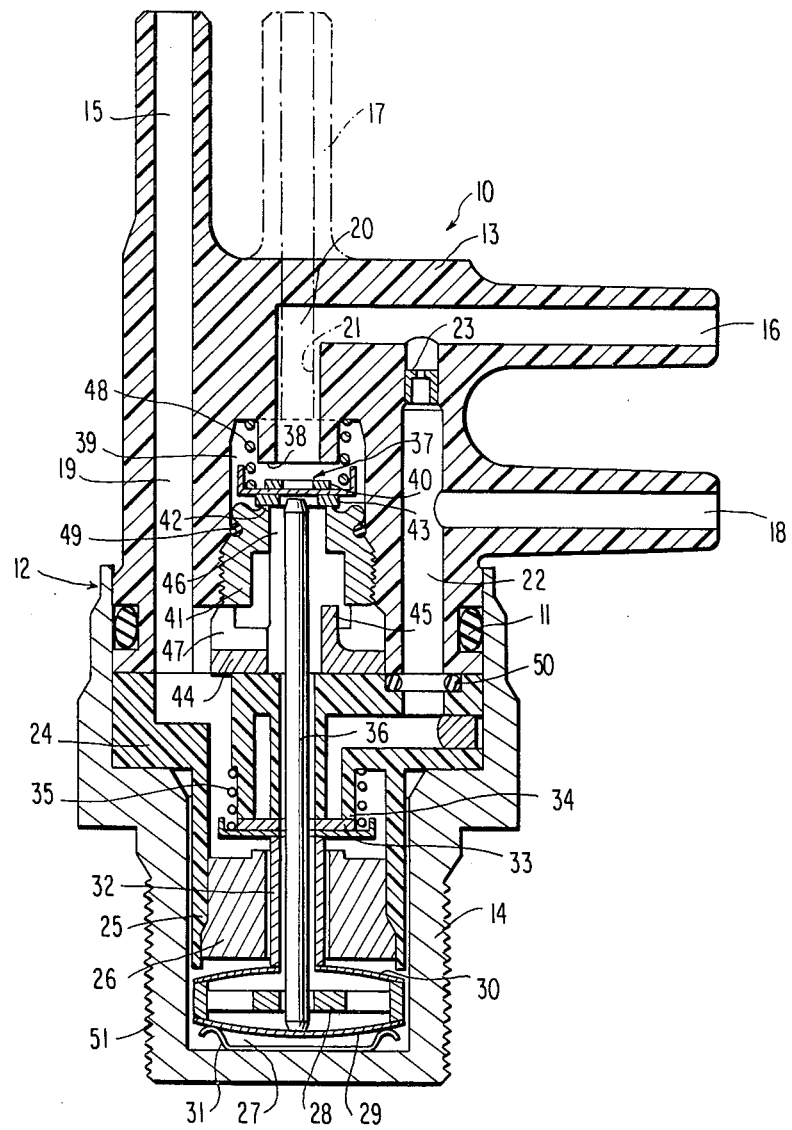

THERMALLY RESPONSIVE VALVE DEVICE

BACKGROUND OF THE INVENTION

1. Field of the Invention

The present invention relates generally to thermally responsive valves and more particularly to a thermally responsive valve which controls fluid communication between a fluid source and a plurality of fluid operated devices by using a plurality of bimetallic members which are operated in response to temperature changes.

2. Description of Prior Art

It is rather well known in the art to provide thermally responsive valve devices wherein a circular disk-shaped thermostatic bimetallic disk is provided which will snap overcenter in response to a variation in temperature to thereby control a fluid passage in an on-off manner. However, such prior thermally responsive valve devices have been designed and arranged wherein a single bimetallic disk controls a single fluid passage. Therefore, in those cases where it is desired to control two independent fluid passages, two separate and independent thermally responsive valve devices must be utilized. This duplication of structure results in higher costs and excessive crowding within the limited space available in a vehicle engine compartment.

Furthermore, since such conventional valves can only control fluid communication between a fluid source and a fluid operated device in an on-off manner, it is not always possible to achieve complete fluid discharge from the fluid operated devices after fluid communication with the fluid source has been shut off. It has been found that such fluid remaining in the devices often interferes with the correct operation of the devices.

SUMMARY OF THE INVENTION

The present invention provides an improved thermally responsive valve device which obviates the various drawbacks of the prior art devices described above.

The present invention provides an improved thermally responsive valve device wherein fluid communication between a first passage and two separate independent fluid passages respectively is provided within a single valve body under the control of two independent thermally responsive bimetallic elements located in a common heat responsive chamber within the same valve body. An additional passage is provided in said valve body for communicating each of said separate independent fluid passages with the atmosphere upon terminating communication of each separate independent fluid passage with said first passage. Therefore, when said first passage is connected to a source of fluid pressure and said two separate independent fluid passages are connected to fluid operated devices any fluid remaining within the fluid operated devices subsequent to disconnection from the source of fluid pressure can readily be communicated to the atmosphere.

The foregoing and other objects, features and advantages of the invention will apparent from the following more particular description of a preferred embodiment of the invention as illustrated in the accompanying drawing.

BRIEF DESCRIPTION OF THE DRAWING

The sole FIGURE is a partial cross-sectional view of a thermally responsive valve device according to the present invention.

DETAILED DESCRIPTION OF THE INVENTION

As clearly shown in the drawing, the thermally responsive valve assembly 10 is comprised of an upper housing 13 made of synthetic plastic material or the like and a cup-shaped lower housing 14 of a heat conductive metal. The housings 13 and 14 are secured together in an air-tight manner at 12 by means of a seal member 11.

The upper housing 13 is provided with a vacuum inlet port 15 connectable to a vacuum pressure source such as the intake manifold of an automobile engine (not shown), an atmospheric pressure inlet port 16 connectable to the atmosphere through the air cleaner of a carburetor of the automobile (not shown), a first outlet port 17 connectable to a first fluid operated device, such as an exhaust gas circulation control valve assembly (E.G.R. valve-not shown) and a second outlet port 18 connectable to a second fluid operated device, such as a choke opener (not shown) for an automobile engine. Each port 15, 16, 17 and 18 is connected to a respective fluid passage 19, 20, 21 and 22 formed within the housing 13. The passages 20 and 22 are connected to each other by means of an orifice member 23 having a flow restriction passage formed between the passages 20 and 22.

An intermediate housing member 24 made of synthetic resin material or the like is disposed between the upper and lower housings 13 and 14 and includes an annular downward extension 25 which extends into the cup-shaped lower housing 14 along the inner surface of the housing 14. An annular separation member 26 is fitted tightly in the extension 25 and forms a chamber 27 between the member 26 and the bottom of the lower housing 14. A pair of bimetallic disk plates 29 and 30 are disposed within the chamber 27. The disk plate 29 is supported at the bottom of the lower housing 14 by a spring 31 with the outer periphery thereof in contact with the outer edge portion of a floating plate 28. When the bimetallic disk plate 29 snaps overcenter when the surrounding temperature increases to a predetermined degree, the shape of the disk 29 becomes similar to that of disk 30 as shown in the drawing. The other bimetallic disk plate 30 is also disposed with its outer periphery in contact with the outer edge portion of the floating plate 28. When the disk plate 30 snaps overcenter due to a predetermined rise in temperature, the shape of the disk will be similar to that of the disk 29 as shown in the drawing.

An annular movable sleeve member 32 is disposed in a central vertical bore of the separation member 26 with the upper end thereof disposed in contact with a first valve member 33 while the lower end is disposed in contact with the central portion of the bimetallic disk plate 30. A first valve member 33 is seated on a seat 34 formed on the intermediate housing member 24 for interrupting fluid communication between passages 19 and 20, i.e., between the vacuum inlet port 15 and the second outlet port 18. The valve member 33 is separable from the seat 34 when the bimetallic disk plate 30 is snapped over by a predetermined temperature change. In other words, when the disk plate 30 snaps over the annular sleeve member 32 moves downwardly so that the valve member 33 will be forced downwardly by a spring 35 disposed between a shoulder portion of the intermediate member 24 and the upper side of said first valve member 33.

A movable rod 36 is disposed in the valve assembly 10 with the lower portion thereof extending downwardly from the central bore of the intermediate housing member 24 through coaxial apertures in the first valve member 33, the annular sleeve member 32, the bimetallic disk plate 30 and the floating plate 28 into contact with the central portion of the bimetallic disk plate 29. The upper portion of the rod 36 extends through the inside of the upper housing 13 with the uppermost end thereof disposed in contact with a second valve member 37 disposed between the passage 21 leading to the first outlet port and the passages 19 and 20 leading to the vacuum and atmospheric pressure inlet ports 15 and 16 respectively. The second valve member 37 has upper and lower valve portions 40 and 43 which are engagable with and separable from valve seats 38 and 46 respectively. As shown in the drawing, the upper valve portion 40 is spaced from the seat 38 formed in the first body 13 while the lower valve portion 43 is disposed in engagement with seat 42 formed on a seat member 41 threaded into the inside wall of the first body 13. Spring 48 continuously biases the valve member 37 downwardly to keep the member 37 in its illustrated position when the disk 29 remains in the condition shown in the drawing.

A member 44 is secured to the inside wall of the housing 13 by any suitable means and includes several projections 45 which extend into the central bore of the seat member 41 to prevent the member 41 from possible rotation caused by undesired loosening of the threaded portions between the seat member 41 and the housing 13. Sealing rings 49 and 50 are provided to seal the member 41 to the housing 13 and to seal the joint between the upper and lower housings surrounding the passage 22.

The outer walls of the lower portion of the housing 14 are provided with a threaded portion 51 which may be threaded into the water jacket of an internal combustion engine for sensing the temperature thereof. With the valve assembly so installed in the engine water jacket and with the first inlet port 15 being connected to the engine intake manifold, the second inlet port 16 being connected to the air cleaner, the first outlet port 17 being connected to an E.G.R. valve and the port 18 being connected to a choke opener the valve assembly operates in the following manner.

When the engine temperature is below a first predetermined level the bimetallic disk members 29 and 30 will remain in position as illustrated in the drawing. Accordingly, the valve members 33 and 37 will be disposed in their illustrated positions. With the valve members so disposed the communication of the ports 17 and 18 with the intake manifold is interrupted. Instead, the first outlet port 17 communicates with the atmosphere through port 16, passage 20, chamber 39 and passage 21 and the second outlet port 18 communicates with the atmosphere through port 16, restricted passage 23 and passage 22. Under these conditions, the E.G.R. valve and the choke opener will be in their inoperative positions.

When the temperature in the engine reaches a first predetermined level the disk 30 snaps over in response to sensing the increased temperature through the metallic cup-shaped body 14. When the disk 30 snaps over the annular sleeve member 32 and the valve member 33 move downwardly under the force of the spring 35 to establish fluid communication between the passages 19 and 22 which will transmit the vacuum from the intake manifold to the choke opener. Thus, the choke opener will be disposed in the operative condition when the temperature of the engine reaches the first predetermined level.

Since the communication between ports 16 and 18 is through the restricted passage 23 no vacuum wll be transmitted to the port 17 under these conditions.

When the temperature in the engine further increases to a second predetermined level higher than the first predetermined level, the bimetallic disk 29 snaps over to push the rod 36 upwardly to force the valve member 37 upwardly thereby separating the contact between the lower valve portion 43 and the seat 42 to establish fluid communication between the chamber 39 and passage 19 through passages 46 and 47. At the same time the valve portion 40 will be engaged with the upper seat 38 to interrupt the communication between the chamber 49 and the passage 20 leading to the atmosphere. Thus, the outlet port 17 will no longer be in communication with atmospheric pressure and instead a vacuum is applied to the port 17 through the passage 21, chamber 39, passages 46 and 47, passage 19 and port 15, thus causing the E.G.R. valve to become operative.

The chamber 39 provided between the seat member 41 and the upper housing 13 is always in communication with the passage 21 and the port 17. Likewise, the passages 46 and 47 are always disposed in communication with the passage 19 which leads to the inlet port 15.

As the engine cools below said first and second predetermined temperature levels, the bimetallic disk members will revert to the illustrated positions so that a vacuum will no longer be applied to the ports 17 and 18 and the fluid operated devices connected thereto. The ports 17 and 18, passages 21 and 22 will then be disposed at atmospheric pressure due to their connection with the port 16.

While the invention has been particularly shown and described with reference to a preferred embodiment thereof, it will be understood by those skilled in the art that various changes in form and details may be made therein without departing from the spirit and scope of the invention.

What is claimed is:

1. A thermally responsive valve assembly comprising:
    a housing;
    a first inlet port adapted to be connected to a vacuum source;
    a second inlet port adapted to be connected to atmospheric pressure;
    a first outlet port adapted to be connected to a first fluid operated device;
    a second outlet port adapted to be connected to a second fluid operated device;
    first passage means formed in said housing for connecting said first inlet port with said first outlet port;
    second passage means formed in said housing for connecting said first inlet port with said second outlet port;
    third passage means for connecting said second inlet port with said first outlet port;

fourth passage means for connecting said second inlet port with said second outlet port, flow restriction means being located in said fourth passage;

first valve means having first and second valves, said first valve being disposed in said first passage means and said second valve means being disposed in said third passage means;

first bimetallic disk means for operating said first valve means in response to changes in temperature;

second valve means disposed in said second passage means; and second bimetallic disk means for operating said second valve means in response to changes in temperature.

2. A thermally responsive valve assembly as set forth in claim 1 wherein said housing includes a first cup-shaped portion adapted to be disposed in heat transfer engagement with a fluid, said first and second bimetallic disk means being located in the bottom of said cup-shaped portion, rod means disposed in engagement with said first valve means and said first bimetallic disk means and annular sleeve means surrounding said rod means and disposed in engagement with said second valve means and said second bimetallic disk means.

3. A thermally responsive valve assembly as set forth in claim 1 further comprising a first chamber located within said housing, a first valve seat means surrounding a passage disposed in communication with said first inlet port and second valve seat means surrounding a passage disposed in communication with said second inlet port, said first and second valve seats being disposed in opposed relation to each other, said first valve means being disposed intermediate said first and second valve seats for engagement of said first valve and said second valve with said first valve seat means and said second valve seat means respectively upon shifting of said first valve means and said first outlet port being disposed in continuous communication with said first chamber.

4. A thermally responsive valve assembly as set forth in claim 3 further comprising a second chamber located within said housing, third valve seat means in said second chamber surrounding a port disposed in communication with said second outlet port, said second valve means being located in said second chamber for selective communication with said second valve seat means and said first inlet port being disposed in continuous communication with said second chamber.

* * * * *